US012775391B1

(12) United States Patent
Alshawabkeh et al.

(10) Patent No.: US 12,775,391 B1
(45) Date of Patent: Oct. 27, 2026

(54) SSD WEAR CONTROL THROUGH DYNAMIC COMPRESSION

(71) Applicant: Dell Products L.P., Round Rock, TX (US)

(72) Inventors: Malak Alshawabkeh, Franklin, MA (US); Kuolin Hua, Natick, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/211,362

(22) Filed: May 19, 2025

(51) Int. Cl.
*G06F 12/00* (2006.01)
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0679* (2013.01)

(58) Field of Classification Search
CPC .... G06F 3/0616; G06F 3/0653; G06F 3/0659; G06F 3/0679; G06F 3/0683; G06F 12/0238; G06F 2212/7205; G06F 2212/7211
See application file for complete search history.

(56) References Cited

U.S. PATENT DOCUMENTS

| | | | | |
|---|---|---|---|---|
| 2017/0285972 | A1* | 10/2017 | Dalmatov | G06F 3/0616 |
| 2017/0371566 | A1* | 12/2017 | Zhou | G06F 11/3452 |
| 2025/0383781 | A1* | 12/2025 | Hua | G06F 3/0616 |

* cited by examiner

*Primary Examiner* — Shawn X Gu
(74) *Attorney, Agent, or Firm* — Krishnendu Gupta; Nikhil Patel

(57) ABSTRACT

One or more aspects of the present disclosure relate to extending solid-state drive (SSD) life in storage arrays through dynamic activity-based compression (ABC) thresholds. The system monitors SSD wear-out rates in primary and secondary storage arrays and independently adjusts ABC thresholds based on workload distributions and wear patterns. The primary array's ABC threshold dynamically adjusts between first and second thresholds for uncompressed hot data regions, while the secondary array may implement more aggressive compression due to lower performance requirements. Heatmap data transfers between arrays enable workload analysis and seamless failover capabilities. The system employs positive and negative feedback control loops to balance performance and wear reduction, throttling write operations through inline compression queuing when wear-out rates exceed targets while maintaining service levels. This approach reduces write amplification, enhances SSD endurance through optimized compression, and minimizes maintenance costs by decreasing SSD replacement frequency across deployments.

20 Claims, 5 Drawing Sheets

SSD WEAR CONTROL THROUGH DYNAMIC COMPRESSION

BACKGROUND

Storage systems commonly employ activity-based compression (ABC) to optimize performance and storage efficiency. In typical storage workloads, input/output (IO) operations exhibit a skewed distribution pattern where a small portion of the address space handles the majority of IO activity. ABC leverages this workload characteristic by segmenting storage regions into "hot" and "cold" data zones based on IO activity levels. The conventional approach uses an 80-20 rule threshold, where approximately 20% of the address space receives the highest IO activity and is designated as hot data. For hot data regions, compression is typically bypassed to maintain optimal system performance, while cold data regions undergo compression to improve storage efficiency. In enterprise storage environments, primary and secondary storage arrays often operate with different hardware configurations and workload patterns, with secondary arrays generally having fewer solid-state drives (SSDs) and handling primarily replication workloads rather than direct user IO.

SUMMARY

One or more aspects of the present disclosure relate to managing data compression in a storage system having primary and secondary storage arrays. In embodiments, wear-out rates of solid-state drives (SSDs) in a primary storage array and a secondary storage array are monitored. Activity-based compression (ABC) thresholds are dynamically adjusted independently for each of the primary and secondary storage arrays based on their respective SSD wear-out rates and input/output (IO) workload distributions. In addition, heatmap data is transferred from the primary storage array to the secondary storage array at regular intervals to enable workload analysis across both arrays. Data written to each array is also compressed based on their respective dynamically adjusted ABC thresholds. Further, write operations are throttled through inline compression queuing when wear-out rates exceed target thresholds while maintaining service level objectives (SLOs).

In embodiments, the ABC threshold can be initialized at a first threshold for uncompressed hot data regions in each array.

In embodiments, the ABC threshold can be adjusted between a second threshold and the first threshold based on monitored wear-out rates and workload patterns, wherein the second threshold is less than the first threshold.

In embodiments, positive feedback control can be implemented to increase the ABC threshold toward the first threshold when wear-out rates are below target thresholds.

In embodiments, negative feedback control can be implemented to decrease the ABC threshold below the first threshold when wear-out rates exceed target thresholds.

In embodiments, random writes can be aggregated into sequential writes to reduce write amplification and improve SSD endurance.

In embodiments, incremental compression operations can be scheduled to prevent sudden performance spikes.

In embodiments, extent-level statistics from the primary storage array and the secondary storage array can be analyzed to establish the ABC thresholds.

In embodiments, greater compression levels can be applied on the secondary storage array compared to the primary storage array based on lower performance requirements of the secondary storage array.

In embodiments, complete extent-level statistics can be transferred from the primary storage array to the secondary storage array to maintain proper ranking of hot and cold regions on the secondary storage array.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
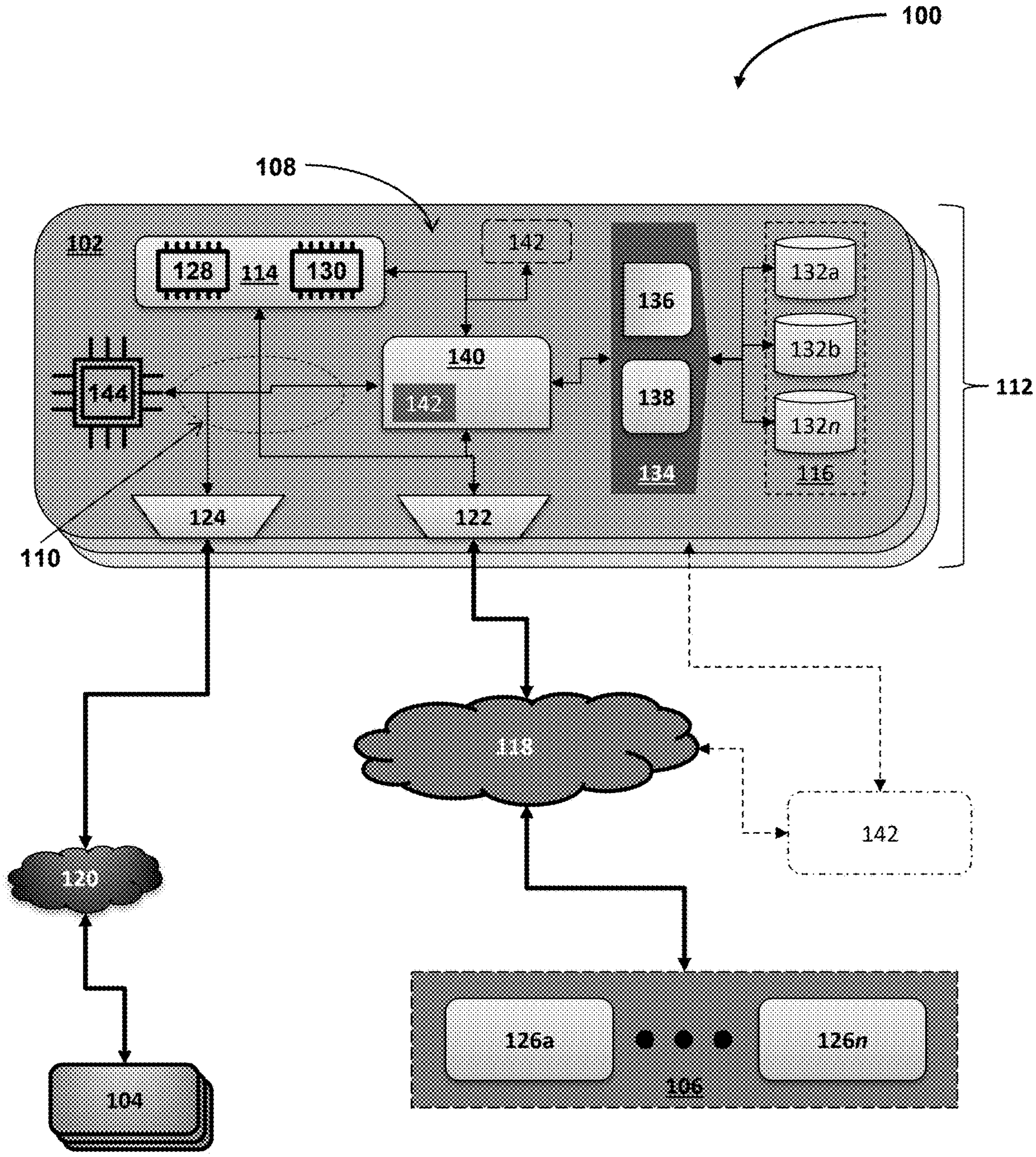
FIG. 1 illustrates a distributed network environment in accordance with embodiments of the present disclosure.

In modern enterprise storage environments, organizations face increasing demands for both performance and reliability from their storage infrastructure. Consider a large financial institution managing critical trading applications that require ultra-low latency access to market data while simultaneously maintaining disaster recovery capabilities across geographically distributed data centers. These environments typically employ solid-state drives (SSDs) in both primary and secondary storage arrays to meet demanding service level objectives (SLOs).

Traditional storage systems implement Activity-Based Compression (ABC) using a static threshold approach based on the well-established 80-20 workload distribution pattern, where approximately 20% of the storage address space handles 80% of the input/output (IO) operations. This approach designates the most active 20% of data regions as "hot" data that bypasses compression to maintain optimal performance, while compressing the remaining "cold" data regions to improve storage efficiency.

However, enterprise storage deployments present unique challenges, particularly in configurations with primary and secondary storage arrays. For example, a financial institution's trading floor may utilize a primary array for real-time market data processing while maintaining a secondary array at a remote site for disaster recovery. These arrays often have different hardware configurations and workload characteristics—the secondary array may have fewer SSDs and primarily handle replication traffic rather than direct user IOs.

Embodiments of the present disclosure provide sophisticated wear control mechanisms through dynamic ABC thresholds that adapt independently for primary and secondary arrays. The system continuously monitors SSD wear-out rates and workload patterns across both arrays using embedded machine learning engines. For the primary array supporting latency-sensitive trading applications, the ABC threshold might dynamically adjust between 5-20% based on current performance requirements and SSD health. Meanwhile, the secondary array handling mostly asynchronous replication could implement more aggressive compression with a lower threshold, as it has more relaxed performance requirements.

The system employs an intelligent feedback control mechanism that responds to SSD wear patterns. When monitoring indicates accelerated wear on the secondary array's SSDs, negative feedback triggers a reduction in the ABC threshold, forcing more data through compression to reduce write amplification. Conversely, positive feedback during periods of healthy SSD operation allows the threshold to increase, optimizing for performance.

A key innovation involves the regular transfer of workload heatmap data from primary to secondary arrays, enabling comprehensive workload analysis across the storage environment. For the financial institution example, this ensures that should a failover occur, the secondary array has detailed knowledge of workload patterns to maintain optimal performance.

The system also implements sophisticated write throttling through inline compression queuing. During peak trading hours when write-intensive workloads might risk accelerated SSD wear, the system can dynamically adjust compression levels to naturally throttle write throughput while maintaining critical SLOs.

To further extend SSD longevity, embodiments aggregate random writes into sequential patterns, significantly reducing write amplification. This is particularly valuable for financial workloads that typically generate many small, random writes during market hours. The system can collect these writes and optimize them into larger sequential operations, improving both performance and SSD endurance.

The enhanced compression capabilities provide additional benefits through optimized SSD overprovisioning. As more data is compressed, especially on secondary arrays with fewer physical SSDs, the effective storage capacity increases. This extra capacity serves as additional overprovisioning, further extending SSD lifespan.

The dynamic threshold adjustment process leverages sophisticated machine learning algorithms to continuously analyze workload patterns and SSD health metrics. The embedded ML engines in both primary and secondary arrays process extensive telemetry data, including IO activity distributions, wear-out rates, and performance metrics, to make intelligent decisions about threshold adjustments.

This ML-driven approach enables predictive wear management, allowing the system to anticipate and prevent potential SSD failures before they occur. For example, if the ML engine detects emerging wear patterns that suggest accelerated degradation, it can proactively adjust compression thresholds to extend drive life while maintaining acceptable performance levels.

The system implements a comprehensive garbage collection optimization strategy by intelligently grouping temporally correlated writes. When multiple writes arrive within a specific time window, the system aggregates them into a single sequential write operation rather than distributing them across different storage locations. This approach significantly reduces fragmentation and subsequent garbage collection overhead, as relocating data during wear leveling operations becomes more efficient.

For enterprise customers like financial institutions, these capabilities translate into tangible operational benefits. The system significantly reduces SSD replacement frequency and associated maintenance costs across global deployments. More importantly, it minimizes service disruptions that could impact critical trading operations, while supporting sustainability initiatives through reduced hardware consumption and energy usage.

Through this sophisticated combination of dynamic threshold management, ML-driven analytics, intelligent write optimization, and advanced garbage collection strategies, embodiments of the present disclosure provide a robust foundation for enterprise storage infrastructure that effectively balances performance, reliability, and cost considerations.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
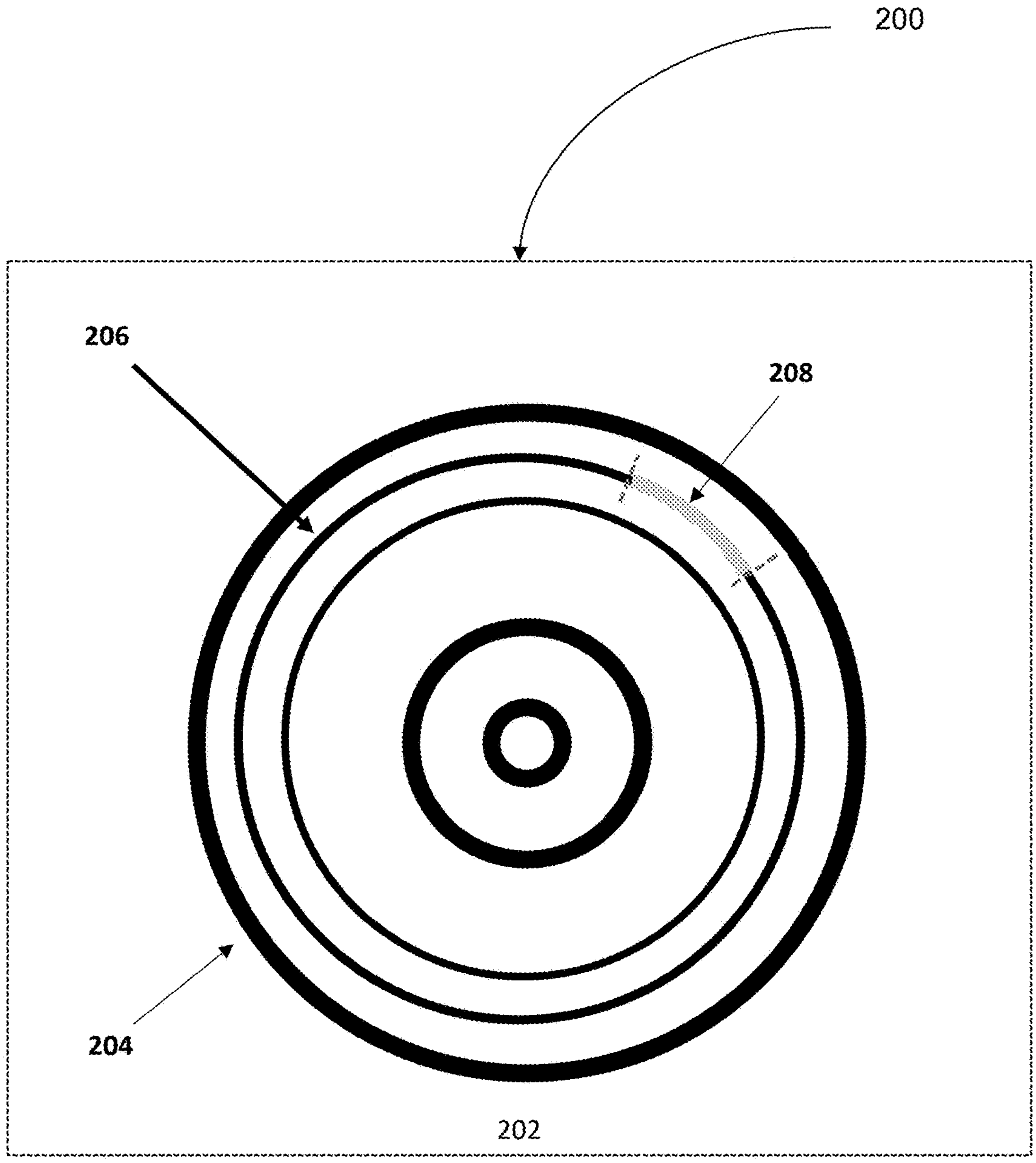
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*. For example, the EDS 140 can provide a host, e.g., client machine 126*a*, with a virtual storage device (e.g., thin-device (TDEV)) that logically represents zero or more portions of each storage device 132*a-n*. For example, the EDS 140 can establish a logical track using zero or more physical address spaces from each storage device 132*a-n*. Specifically, the EDS 140 can establish a continuous set of logical block addresses (LBA) using physical address spaces from the storage devices 132*a-n*. Thus, each (LBA) represents a corresponding physical address space from one of the storage devices 132*a-n*. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
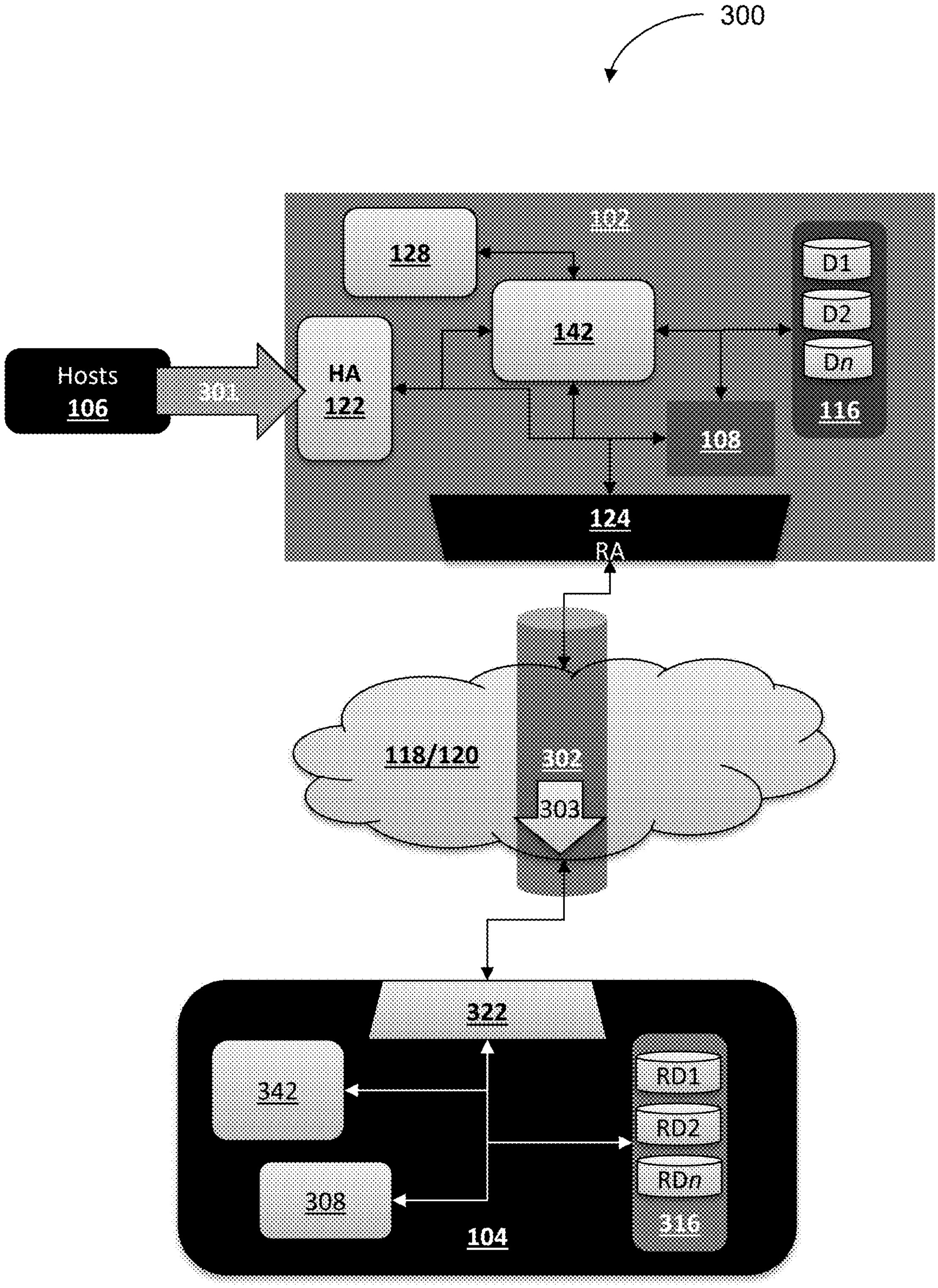
FIG. 3 is a block diagram of a communications network, including a storage array and a remote data facility (RDF) in accordance with embodiments of the present disclosure.

Regarding FIG. 3, a distributed network environment 300 can be substantially similar to the distributed network environment 100 of FIG. 1. For instance, the distributed network environment 300 can include a storage array 102, remote array 104, and hosts 106. In embodiments, the storage array 102 can receive an input/output (IO) workload 301 from the hosts 106. The storage array 102 can include a host adapter (HA) 122 that processes the IO workload 301. The HA 122 can classify the IO workload 301 and its IO operations. The classification can include identifying the type of IO operation (e.g., read, write, replication), IO size, and associating each operation with a specific service level (e.g., Diamond, Platinum, Gold, Silver, and Bronze).

In embodiments, a service level agreement (SLA) can define the level of service expected from a storage array (e.g., the storage array 102) or a remote system or array (e.g., the remote data facility (RDF) 104). Specifically, the SLA can define performance metrics for processing IO workloads (e.g., the IO workload 301) and their respective IO operations. The performance metrics can include throughput (e.g., data transfer rate in megabytes per second (MB/s) or gigabytes per second (GB/s)), Input/Output Operations Per Second (IOPS) (e.g., the minimum read and write operations the storage array should be able to handle per second), and latency (e.g., the maximum acceptable delay for an IO operation to be completed).

Furthermore, the SLA can categorize IO operations into distinct priority levels, such as Diamond, Platinum, Gold, Silver, and Bronze Service Levels. Additionally, critical operations that affect core business functions might be classified at a higher priority level, requiring faster throughput and lower latency. Accordingly, the SLA can specify different performance metrics for each priority level, ensuring that critical operations are given priority over less critical tasks.

In embodiments, IO operations critical to business operations, such as financial transactions, real-time data analytics, or emergency response systems, can have a high priority level (e.g., Diamond or Platinum). The storage array 102 can give these high-priority level IO operations preferential access to resources (e.g., faster CPUs, more cache memory, and quicker storage media). Essential but not critical IO operations, such as batch processing jobs, standard database queries, or internal data transfers, can have a medium priority level (e.g., Gold or Silver). The storage array 102 can provide these medium-priority IO operations with adequate resources to ensure good performance without preempting resources from higher-priority tasks. Non-critical IO operations that can tolerate delays, such as backup operations, data archiving, or other maintenance-related tasks, can have a low priority level (e.g., Bronze). The storage array 102 can allocate resources not used by higher-priority tasks to these low-priority IO operations. Furthermore, the storage array 102 can pause or slow down resource allocations for these low-priority IO operations during periods of high system load to preserve performance for higher-priority IO operations.

In embodiments, the HA 122 can parse information from each IO operation in the IO workload 301. For example, each IO operation can include information such as the target device (TDEV), which specifies the virtual volume on which the data corresponding to each IO operation resides, the LBA (Logical Block Address), which indicates the starting block address where the data needs to be read from or written to, and Logical Block Count (LBC), which specifies the count of logical blocks that the IO operation is intended to access starting from the specified LBA.

Using the LBA and LBC, the controller 142 maps these logical addresses to physical storage locations. This mapping can involve consulting a mapping table that translates logical block addresses into physical block addresses or locations on the storage media, such as persistent storage 116. Once the controller 142 has mapped the LBA to a specific physical location, it identifies the corresponding TIDs. These TIDs represent specific tracks on the disks where the data blocks are physically stored or need to be written. The TID helps locate the data and plays a crucial role in optimizing disk operations by allowing the controller to manage and access tracks efficiently.

In embodiments, the controller 142 uses metadata associated with each TID to manage data more effectively. This metadata can include data protection levels, compression settings, and deduplication information. It also includes the status of the data, such as whether it is clean or dirty (modified but not yet written to disk). Based on the TIDs and the associated metadata, the controller 142 can decide to cache certain data blocks in the array's GM 128 to speed up future accesses. This decision is influenced by factors such as the frequency of access (hot data) and the IO patterns observed. With the TIDs identified and any necessary data cached, the controller 142 executes the IO operation. For read operations, it retrieves the data from the specified tracks and sends it back to the host. For write operations, it writes the data to the designated tracks and updates the metadata accordingly.

In embodiments, the storage array (e.g., "local" or "source" array) 102 can be paired with a secondary storage array (e.g., "remote," "target," or "RDF" array) 104 located at a different geographical site. For instance, the storage array 102 can establish an RDF link 302 with the RDF array 104 over a network 118/120. Accordingly, the storage array 102 can use the RDF array 104 as a data replication and disaster recovery solution, ensuring data availability and integrity across geographically dispersed locations. Accordingly, the RDF 104 can receive replication workloads 303, which include data and operations mirrored from the primary storage array 102 to the RDF 104.

The storage array 102 can also designate specific logical volumes or devices, representing one or more portions of the storage devices D1-*n* in the storage array's persistent storage 116, for replication. In particular, the storage array 102 can logically group the designated volumes or devices for replication. For example, the storage array 102 can configure each group with specific replication properties, such as synchronous or asynchronous replication, depending on the required data protection level and performance impact.

In synchronous replication, every write IO operation from a host (e.g., one of the hosts 106) to the primary storage array (e.g., the storage array 102) is simultaneously replicated to the secondary storage array (e.g., the RDF 104). Further, the primary storage array waits for an acknowledgment from the secondary array before confirming the write IO operation to the host. Accordingly, synchronous replication guarantees that both arrays are always in sync and ensures zero data loss.

Asynchronous replication involves replicating data to the secondary array with a slight delay. The primary array does not wait for an acknowledgment for each write operation, which minimizes the impact on performance. This method is suitable for situations where some data loss is tolerable in exchange for higher throughput and lower latency.

In embodiments, the local storage array 102 and the remote storage array 104 can include respective controllers 142/342. The controllers 142/342 in the primary and secondary storage arrays 102/304 can implement an intelligent system for dynamically managing Activity-Based Compression (ABC) thresholds to optimize SSD endurance while maintaining performance requirements. The controllers 142/342 monitor wear-out rates of SSDs 116/316 in their respective arrays and adjust compression thresholds independently based on observed workload patterns and SSD health metrics.

In embodiments, the primary array controller 142 initializes with a default ABC threshold of Y % (e.g. 20%) for uncompressed hot data regions, following the traditional 80-20 workload distribution pattern where 80% of IO activity is assumed to be directed to 20% of the address space. The controller 142 continuously monitors SSD wear-out rates through direct hardware queries and garbage collection metrics, using this data to make dynamic adjustments to the ABC threshold between X % and Y % (e.g., 5%-20%).

The primary controller 142 implements a sophisticated feedback control mechanism. When wear-out rates are below target thresholds, it employs positive feedback control to increase the ABC threshold toward the 20% maximum, prioritizing performance. Conversely, when wear-out rates exceed targets, negative feedback control decreases the threshold, potentially as low as 5%, to enhance compression and reduce write stress on the SSDs.

The secondary array controller 342 operates similarly but with distinct characteristics due to its different workload profile. Since the secondary array typically has fewer SSDs 316 and handles primarily replication workloads 303 rather than direct host IO, its controller generally maintains lower ABC thresholds to provide greater compression levels. The secondary controller 342 can tolerate higher latencies from increased compression since it doesn't directly serve user workloads.

To enable coordinated operation, the primary controller 142 transfers complete extent-level statistics and heatmap data to the secondary controller 342 at configurable intervals (typically every two hours). This transfer ensures the secondary controller 342 maintains proper ranking of hot and cold regions and can make informed decisions about compression thresholds. The heatmap data is particularly crucial for workload analysis and seamless failover scenarios.

Both controllers 142/342 implement write throttling through inline compression queuing when wear-out rates exceed targets. This mechanism introduces controlled delays through the compression process, effectively managing write throughput while maintaining service level objectives. The controllers 142/342 add approximately 300 microseconds of latency for compression operations, with potential additional overhead for deduplication.

In embodiments, the inline compression process is managed through a sophisticated queuing system that helps throttle write throughput when necessary. For write-intensive workloads, the controllers 142/342 increase the amount of ABC compressed data, which creates controlled queuing delays to effectively manage write operations while maintaining service level objectives.

The controllers 142/342 make intelligent decisions about when to apply inline compression versus allowing uncompressed writes based on the dynamic ABC thresholds. For hot data regions that exceed the threshold (which ranges from 5-20%), compression is bypassed to maintain performance. For cold data regions below the threshold, inline compression is applied to reduce write volume.

When SSD wear levels become concerning, the controllers 142/342 can increase the amount of inline compression by adjusting the ABC threshold downward. This results in more data being compressed before writing, effectively throttling write operations through the additional compression latency while still maintaining required service levels.

The inline compression approach differs from background compression, which traditionally processes hot data after a delay period (e.g., one week). By prioritizing inline compression, the controllers 142/342 can immediately reduce write volumes and better manage SSD wear. This is particularly important for the secondary array 104, which can tolerate higher compression latencies since it doesn't directly serve user workloads.

In embodiments, the primary array controller 142 also combines inline compression with write aggregation capabilities. When receiving multiple random writes that are temporally correlated, it can combine them into larger sequential write operations while applying compression, further optimizing the write process and reducing SSD wear.

For instance, the controllers 142/342 can optimize write operations by aggregating random writes into sequential patterns. When receiving multiple random writes that are temporally correlated, the controllers 142/342 combine them into larger sequential write operations. This aggregation reduces write amplification and improves SSD endurance by minimizing the creation of fragmented storage patterns that would require additional garbage collection overhead.

For garbage collection optimization, the controllers 142/342 track time-correlated IOs and maintain them in proximity on the storage media. When data needs to be relocated due to compression size changes, this approach creates single consolidated holes rather than multiple fragmented spaces, reducing the overhead of garbage collection operations.

The controllers 142/342 utilize embedded machine learning engines to analyze workload patterns and adjust ABC thresholds dynamically. These ML engines process extent-level statistics from both arrays to establish optimal threshold values based on current conditions. The ML models consider factors such as IO activity distribution, wear-out rates, and workload skew to make intelligent decisions about compression levels.

To prevent sudden performance impacts, the controllers 142/342 implement incremental compression operations, scheduling them in a controlled manner. They also maintain separate ABC thresholds for each array 102/304, allowing the secondary array controller 342 to implement more aggressive compression without impacting primary array performance.

In embodiments, the controllers 142/342 can continuously monitor SSD health through manufacturer-provided interfaces, tracking wear levels, garbage collection metrics, and overall drive endurance. This monitoring feeds into a feedback control system implemented by the controllers 142/342, allowing proactive adjustment of compression thresholds before SSDs reach critical wear levels. In extreme cases where SSD health becomes critical, the controllers 142/342 can prioritize drive longevity over strict performance requirements to prevent system failures and unplanned downtime.

Through this sophisticated control system, the controllers 142/342 effectively balance performance requirements with SSD longevity, implementing dynamic compression strategies that adapt to changing workload patterns and system health metrics while maintaining required service levels.

For example, the controllers 142/342 can implement sophisticated workload analysis capabilities to optimize compression decisions. When analyzing workload patterns, the controllers 142/342 examine IO activities across different address ranges and generate detailed IO activity distributions. This analysis reveals typical storage workload skews where a small portion of the address space handles the majority of IO operations.

For workload characterization, the controllers 142/342 can segment the address space into bins and track the number of extents within each bin that experience specific IO activity levels. This granular monitoring enables the controllers 142/342 to identify hot regions that require special handling to maintain performance while managing SSD wear.

The controllers 142/342 utilize embedded machine learning engines that process historical workload data to predict future access patterns. These ML models analyze extent-level statistics from both arrays 102/304 to establish optimal threshold values based on observed patterns. The ML engines consider factors such as IO distribution skew, temporal correlation between writes, and overall system health metrics.

To enable seamless workload analysis across arrays 102/304, the primary controller 142 transfers complete extent-level statistics to the secondary controller 342 at configurable intervals, typically every two hours. This transfer includes comprehensive heatmap data that allows the secondary controller to maintain proper ranking of hot and cold regions. The complete statistics transfer is crucial for accurate workload characterization even though some extents may not be actively replicated.

The controllers 142/342 implement intelligent garbage collection optimization by tracking temporally correlated IOs. When multiple random writes arrive that are likely to be accessed together, the controllers 142/342 combine them into consolidated sequential writes. This aggregation reduces fragmentation and minimizes future garbage collection overhead.

For write operation management, the controllers 142/342 can introduce controlled delays through inline compression queuing. This mechanism allows throttling of write throughput when wear levels become concerning, while still maintaining required service levels. The controllers 142/342 carefully balance these delays with performance requirements.

To prevent sudden performance impacts, the controllers 142/342 implement incremental compression operations, scheduling them in a controlled manner that avoids spikes in system load. They maintain separate compression queues for each array 102/304, allowing independent optimization.

The controllers 142/342 continuously monitor SSD health through manufacturer-provided interfaces, tracking wear levels, garbage collection metrics, and overall drive endurance. This monitoring feeds into a sophisticated feedback control system that proactively adjusts compression thresholds before SSDs reach critical wear levels.

For the secondary array controller 342, which typically has fewer SSDs 316 and handles primarily replication workloads 303, the controller 342 can implement more aggressive compression strategies. Since this array doesn't directly serve user workloads, it can tolerate higher latencies from increased compression operations.

The controllers 142/342 maintain detailed statistics about extent-level IO patterns, compression ratios achieved, and SSD health metrics. This data allows them to continuously refine their threshold adjustment algorithms and validate that wear reduction goals are being met while maintaining performance requirements.

In critical health scenarios, the controllers 142/342 can temporarily prioritize SSD longevity over strict performance requirements. This prevents unplanned downtime from drive failures while still maintaining acceptable service levels. The controllers 142/342 implement this through dynamic adjustment of compression thresholds and write throttling mechanisms.

In embodiments, the controllers' machine learning capabilities extend to predicting future workload patterns and proactively adjusting compression strategies. By analyzing historical access patterns and system health metrics, the controllers 142/342 can anticipate periods of high activity and adjust their behavior accordingly.

For optimal resource utilization, the controllers 142/342 implement intelligent write coalescing that combines multiple small random writes into larger sequential operations. This reduces write amplification and improves overall system efficiency while extending SSD lifespan.

In embodiments, the controllers 142/342 can support customer-configurable thresholds that allow tuning of the compression behavior based on specific workload requirements and business needs. This flexibility enables optimization for different use cases while maintaining core wear reduction benefits.

Figure 4:
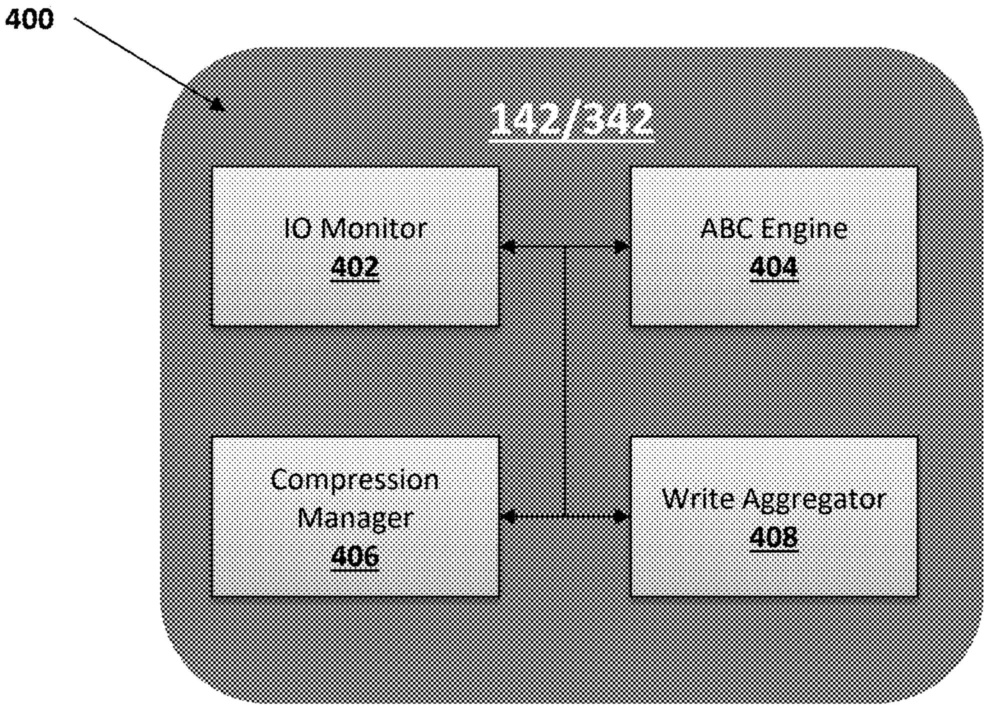
FIG. 4 is a block diagram of a controller in accordance with embodiments of the present disclosure.

Regarding FIG. 4, a primary storage array (e.g., the storage array 102 of FIG. 1) and a secondary storage array (e.g., the remote system 104 of FIG. 1) can include controllers 142/342, including logic, hardware, and circuitry 400 that monitor SSD wear-out rates and dynamically adjust activity-based compression thresholds while sharing heatmap data to optimize performance and extend SSD lifespan across storage systems.

In embodiments, the controller 142/342 can include an IO monitor 402 configured to analyze workload patterns and track SSD wear levels across both primary and secondary storage arrays. The monitor 402 observes IO activities within specific address ranges and generates IO activity distribution data by counting the number of extents that experience particular IO patterns. This monitoring can reveal typical storage workload "skew" where a small portion of the address range handles the majority of IOs.

The monitor 402 tracks extent-level statistics to identify hot and cold regions based on IO activity. For hot extents representing the busiest allocations, the IO monitor 402 helps determine whether to bypass compression to maintain optimal system performance. The monitor 402 supports dynamic threshold adjustment between, e.g., 5-20% based on observed workload patterns and SSD health metrics.

The IO monitor 402 interfaces directly with the SSDs to gather wear-out data through hardware queries and garbage collection metrics. This SSD health data is used to implement both positive and negative feedback loops-positive feedback when wear levels are acceptable allows focusing on performance, while negative feedback during concerning wear levels triggers more aggressive compression.

For workload analysis across arrays, the IO monitor 402 facilitates the transfer of complete extent-level statistics and heatmap data from the primary to secondary array at configurable intervals (e.g. every 2 hours). This enables proper ranking of hot/cold regions on the secondary array and helps coordinate compression decisions between arrays.

The monitor 402 tracks different types of IO operations, including synchronous and asynchronous writes on the secondary array. For write-intensive workloads, the IO monitor 402 helps identify when inline compression queuing should be used to effectively throttle write throughput. The monitoring also supports write aggregation by helping identify time-correlated IOs that can be combined into sequential writes to reduce fragmentation.

Through continuous monitoring of both arrays, the IO monitor 402 enables independent but coordinated ABC threshold management optimized for each array's specific conditions-allowing the primary array to focus more on performance while enabling higher compression levels on the secondary array when needed. This monitoring intelligence helps extend SSD lifespan by reducing write amplification and wear while still maintaining required service levels In embodiments, the controller 142/342 can include an ABC engine 404 that implements dynamic threshold management for activity-based compression across primary and secondary storage arrays. The engine 404 initializes with a default threshold of, e.g., 20% for uncompressed hot data regions and can adjust this threshold between, e.g., 5-20% based on monitored SSD wear-out rates and workload patterns.

For threshold calculation, the ABC engine 404 employs a time series model that analyzes extent-level statistics to determine optimal compression settings. When wear-out rates exceed targets, the engine 404 implements negative feedback control to decrease thresholds below 20%, such as adjusting to 14% to improve wear-out conditions. Conversely, when wear-out rates are acceptable, positive feedback control increases thresholds toward 20% to prioritize performance.

The engine 404 processes extent-level statistics from both arrays to establish appropriate ABC thresholds independently. For the secondary array, the ABC engine 404 typically implements more aggressive compression by lowering thresholds further, since this array may have fewer SSDs and can tolerate slower performance. The engine 404 calculates the proportion of least active hot data to compress using the formula $1-(Y/X)$, where Y is the new threshold percentage and X is the initial threshold percentage.

To prevent performance impacts, the ABC engine 404 schedules incremental compression operations rather than applying changes suddenly. For write-intensive workloads, the engine 404 implements inline compression queuing to throttle write throughput while maintaining service level objectives.

The engine 404 coordinates with the IO monitor 402 to receive continuous feedback on SSD health and workload patterns. This enables dynamic adjustment of compression thresholds based on real-time conditions in each array. For the secondary array specifically, the ABC engine 404 can implement more aggressive compression since this array typically handles asynchronous writes and copy operations rather than direct user workloads.

In embodiments, the ABC engine 404 can also manage the aggregation of random writes into sequential writes to reduce write amplification. This process involves analyzing time-correlated IOs and combining them to minimize fragmentation and garbage collection overhead. The engine's threshold management helps balance these optimizations with performance requirements across both arrays while extending SSD lifespan through controlled compression.

In embodiments, the controller 142/342 can include a compression manager 406 that implements both inline and background compression operations across primary and secondary storage arrays while managing write throttling to optimize SSD endurance. The manager 406 handles two primary types of compression: inline compression that occurs during initial IO operations with approximately 300 microseconds of latency, and background compression that processes data after a delay.

For inline compression, compression manager 406 makes real-time decisions based on the dynamically adjusted ABC thresholds for each array. When processing write-intensive workloads, the manager 406 implements queuing delays through inline compression to effectively throttle write throughput while maintaining service level objectives (SLOs). This queuing mechanism helps regulate write operations when SSD wear-out rates exceed target thresholds.

The manager 406 implements different compression strategies for primary and secondary arrays based on their specific requirements and configurations. For the secondary array, which typically has fewer SSDs and handles primarily asynchronous writes, the compression manager 406 applies more aggressive compression settings since slower read/write performance is acceptable. This helps optimize storage space utilization and reduce wear on the limited SSD resources in the secondary array.

For write operation optimization, the compression manager 406 coordinates with the write aggregator to combine multiple random writes into sequential operations. This process involves identifying time-correlated IOs and grouping them together to reduce fragmentation and minimize garbage collection overhead. The manager 406 schedules these operations incrementally to prevent sudden performance spikes while maintaining system responsiveness.

In embodiments, the compression manager 406 also implements positive and negative feedback control based on monitored SSD wear rates. When wear levels are acceptable, the manager 406 reduces compression to prioritize performance. Conversely, when concerning wear levels are detected, it increases compression to extend SSD lifespan.

This adaptive approach helps balance performance requirements with SSD endurance across both arrays.

Through these mechanisms, the compression manager 406 helps achieve key system benefits including reduced write volume, minimized write amplification, enhanced SSD overprovisioning, and lower operational costs through decreased SSD replacement frequency. The manager's intelligent compression and write throttling capabilities support the overall goal of extending SSD lifespan while maintaining required service levels.

In embodiments, the controller 142/342 can include a write aggregator 408 that implements intelligent write operation management to optimize SSD endurance across primary and secondary storage arrays. The aggregator 408 combines multiple random writes into sequential write operations by identifying and grouping time-correlated IOs, which helps reduce fragmentation and minimize garbage collection overhead.

For garbage collection optimization, the write aggregator 408 analyzes write patterns to identify opportunities for combining writes that occur close together in time. Rather than writing data directly to different parts of the disk which creates multiple holes requiring garbage collection, the aggregator 408 combines temporally related writes into a single sequential write operation. This approach anticipates that future writes to these locations will also be correlated in time, allowing more efficient data relocation when needed.

The aggregator coordinates 408 with the compression manager 406 to process write operations based on the dynamically adjusted ABC thresholds. For write-intensive workloads, the write aggregator 408 helps implement throttling through strategic write combining and queuing while maintaining required service levels. This is particularly important for the secondary array which may have fewer SSDs but handles significant write traffic through asynchronous replication.

In embodiments, the write aggregator 408 processes writes differently between primary and secondary arrays based on their specific configurations and requirements. For the secondary array, which primarily handles replication writes rather than direct user workloads, the aggregator 408 can implement more aggressive write combining since slower write performance is acceptable. This helps optimize storage utilization and reduce wear on the limited SSD resources in the secondary array.

Through these mechanisms, the write aggregator 408 helps achieve key system benefits including minimized write amplification, enhanced SSD overprovisioning through more efficient storage utilization, and reduced operational costs through decreased SSD replacement frequency. The aggregator's intelligent write combining capabilities support the overall goal of extending SSD lifespan while maintaining required performance levels.

The write aggregator 408 also helps improve system efficiency by reducing the number of garbage collection operations needed. By converting random writes into sequential writes, it minimizes fragmentation which in turn reduces the overhead of data relocation and defragmentation processes. This comprehensive approach to write optimization helps extend SSD endurance across both primary and secondary arrays.

Although what is described herein shows details of logic, hardware, and circuitry 400 that may reside in the controller 142/342, all or portions of the illustrated components may also reside elsewhere in the storage array (e.g., one or more of the storage array's components 108/308 of FIG. 3).

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 5:
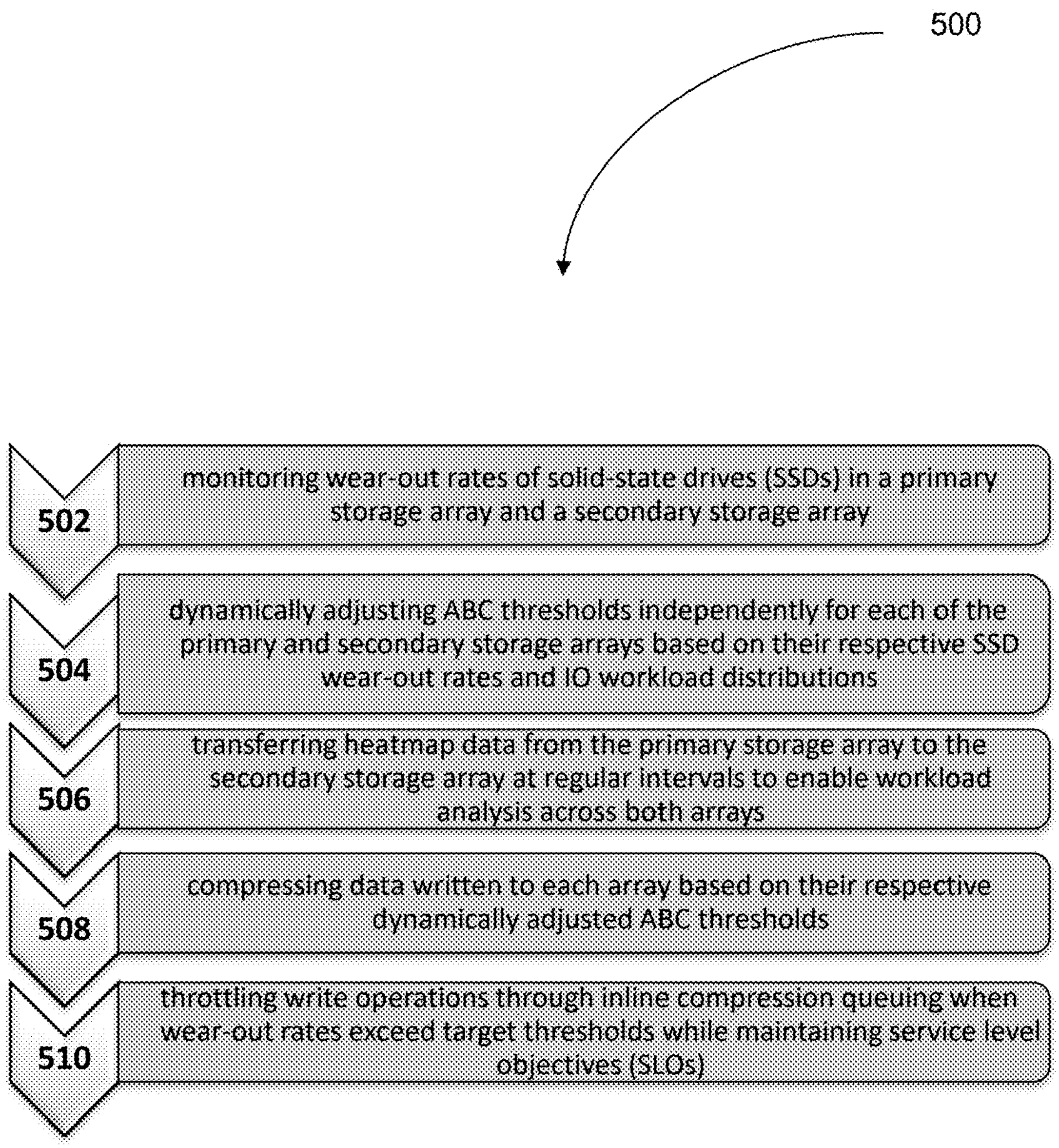
FIG. 5 is a flow diagram of a method for extending solid-state drive (SSD) life in storage arrays through dynamic activity-based compression (ABC) thresholds per embodiments of the present disclosure.

Regarding FIG. 5, a method 500 relates to managing data compression in a storage system having primary and secondary storage arrays. In embodiments, the controller 142/342 of FIG. 3 can perform all or a subset of operations corresponding to the method 500.

For example, the method 500, at 502, can include monitoring wear-out rates of solid-state drives (SSDs) in a primary storage array and a secondary storage array. Additionally, at 504, the method 500 can include dynamically adjusting activity-based compression (ABC) thresholds independently for each of the primary and secondary storage arrays based on their respective SSD wear-out rates and input/output (IO) workload distributions. Further, the method 500, at 506, can include transferring heatmap data from the primary storage array to the secondary storage array at regular intervals to enable workload analysis across both arrays. At 508, the method 500 can also include compressing data written to each array based on their respective dynamically adjusted ABC thresholds. The method 500, at 510, can further include throttling write operations through inline compression queuing when wear-out rates exceed target thresholds while maintaining service level objectives (SLOs).

Further, each operation can include any combination of techniques implemented by the embodiments described herein. Additionally, one or more of the storage array's components 108 or remote array's components 308 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

monitoring wear-out rates of each solid-state drive (SSD) in a primary storage array and a secondary storage array;

dynamically adjusting activity-based compression (ABC) thresholds independently for each of the primary and secondary storage arrays based on their respective SSD wear-out rates and input/output (IO) workload distributions;

transferring heatmap data from the primary storage array to the secondary storage array at regular intervals to enable workload analysis across both arrays;

compressing data written to each array based on their respective dynamically adjusted ABC thresholds; and throttling write operations through inline compression queuing for each SSD when each SSD wear-out rate exceeds a target threshold while maintaining service level objectives (SLOs).

2. The method of claim 1, further comprising:

initializing each ABC threshold at a first threshold for uncompressed hot data regions in each array.

3. The method of claim 1, further comprising:

adjusting each ABC threshold between a second threshold and the first threshold based on monitored wear-out rates and workload patterns, wherein the second threshold is less than the first threshold.

4. The method of claim 3, further comprising:

implementing positive feedback control to increase each ABC threshold toward the first threshold when each SSD's wear-out rate is below its respective target threshold.

5. The method of claim 3, further comprising:

implementing negative feedback control to decrease each ABC threshold below the first threshold when each SSD's wear-out rate exceeds its respective target threshold.

6. The method of claim 1, further comprising:

aggregating random writes into sequential writes to reduce write amplification and improve SSD endurance.

7. The method of claim 1, further comprising:

scheduling incremental compression operations to prevent sudden performance spikes.

8. The method of claim 1, further comprising:

analyzing extent-level statistics from the primary storage array and the secondary storage array to establish the ABC thresholds.

9. The method of claim 1, further comprising:
applying greater compression levels on the secondary storage array compared to the primary storage array based on lower performance requirements of the secondary storage array.

10. The method of claim 1, further comprising:
transferring complete extent-level statistics from the primary storage array to the secondary storage array to maintain proper ranking of hot and cold regions on the secondary storage array.

11. An apparatus with a memory and processor, the apparatus configured to:
monitor wear-out rates of each solid-state drive (SSD) in a primary storage array and a secondary storage array;
dynamically adjust activity-based compression (ABC) thresholds independently for each of the primary and secondary storage arrays based on their respective SSD wear-out rates and input/output (IO) workload distributions;
transfer heatmap data from the primary storage array to the secondary storage array at regular intervals to enable workload analysis across both arrays;
compress data written to each array based on their respective dynamically adjusted ABC thresholds; and
throttle write operations through inline compression queuing for each SSD when each SSD wear-out rate exceeds a target threshold while maintaining service level objectives (SLOs).

12. The apparatus of claim 11, further configured to:
initialize each ABC threshold at a first threshold for uncompressed hot data regions in each array.

13. The apparatus of claim 11, further configured to:
adjust each ABC threshold between a second threshold and the first threshold based on monitored wear-out rates and workload patterns, wherein the second threshold is less than the first threshold.

14. The apparatus of claim 13, further configured to:
implement positive feedback control to increase each ABC threshold toward the first threshold when each SSD's wear-out rate is below its respective target threshold.

15. The apparatus of claim 13, further configured to:
implement negative feedback control to decrease each ABC threshold below the first threshold when each SSD's wear-out rate exceeds its respective target threshold.

16. The apparatus of claim 11, further configured to:
aggregate random writes into sequential writes to reduce write amplification and improve SSD endurance.

17. The apparatus of claim 11, further configured to:
schedule incremental compression operations to prevent sudden performance spikes.

18. The apparatus of claim 11, further configured to:
analyze extent-level statistics from the primary storage array and the secondary storage array to establish the ABC thresholds.

19. The apparatus of claim 11, further configured to:
apply greater compression levels on the secondary storage array compared to the primary storage array based on lower performance requirements of the secondary storage array.

20. The apparatus of claim 11, further configured to:
transfer complete extent-level statistics from the primary storage array to the secondary storage array to maintain proper ranking of hot and cold regions on the secondary storage array.

* * * * *